Sept. 20, 1971 J. R. KRAUSE 3,606,336
WORD ASSOCIATION GAME
Filed May 29, 1968
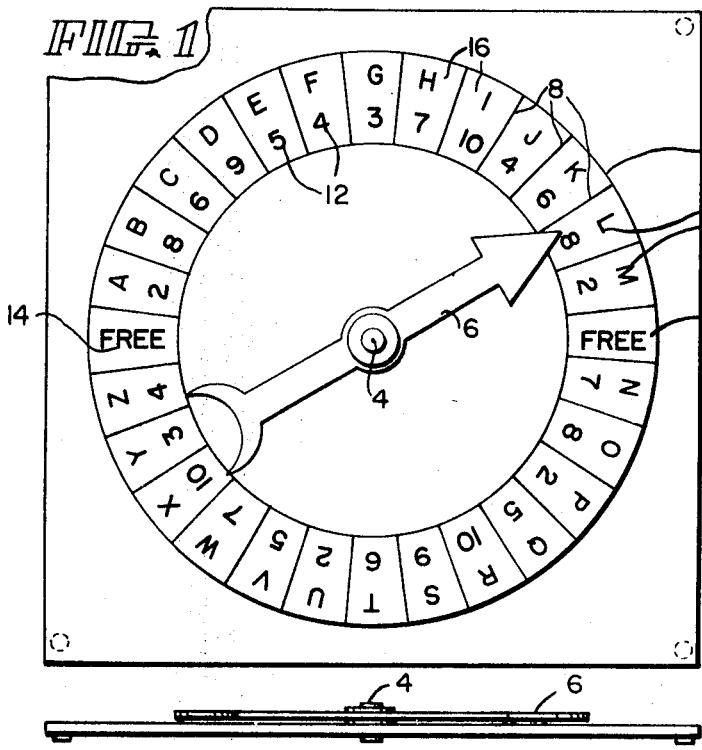
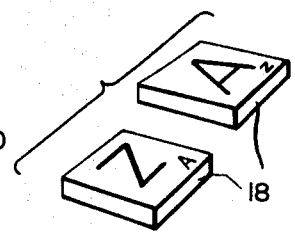
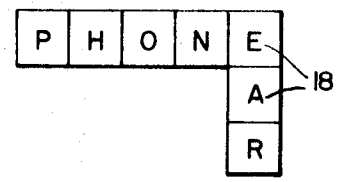
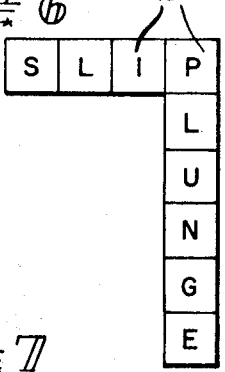
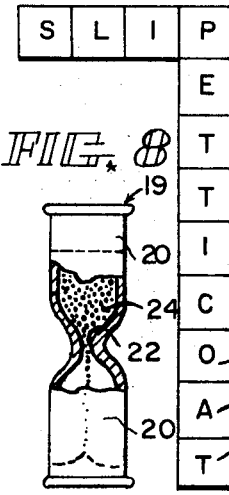
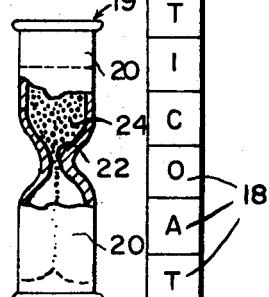
INVENTOR.
JACK R. KRAUSE
BY
Wayland D. Keith
HIS AGENT 3,606,336
WORD ASSOCIATION GAME
Jack R. Krause, Alexandria, La.
(802 N. Puget St., Olympia, Wash. 98501)
Filed May 29, 1968, Ser. No. 733,119
Int. Cl. A63f 3/00
U.S. Cl. 273—135D  1 Claim

ABSTRACT OF THE DISCLOSURE

A word association game which includes an indicator board having a series of alphabet letters and a series of numerals peripherally spaced thereon, with a rotatable pointer associated therewith to be spun to indicate a number and a letter, to aid in starting the game, and to be spun to indicate a numeral to aid in continuing the game. Lettered playing pieces, each having a first letter on two opposed faces, and an index letter on each of the two opposed faces differing only in size from the letter on the opposite face, are provided to enable the building of words as indicated by the chance selected letter and number for the starting play and by chance selected numbers to form subsequent words. The second word is formed at a right angle to the first word, the initial letter of which is the last letter of the preceding word, subsequent words are formed at a right angle to the preceding word in like manner. The words formed must have an associated thought suggestion with the preceding word.

---

This invention relates to games and more particularly to a word association game.

Various word games have been proposed heretofore, but these, for the most part, utilized entire words or words that were built by chance, as by throwing dice or the like.

The present game is so constructed that any number of players may participate, and play as individuals, in partners or in sets of players. The present game provides a multiplicity of advantages, first it aids in expanding the vocabulary and in understanding the spelling, the meaning and the connotation of words, second, it teaches orthography, third, it tends to increase the power of concentration, and fourth, it provides intellectual stimulation and wholesome amusement for those taking part as well as for those who are looking on.

An object of this invention is to provide a word association game which may be played by anyone, with a minimum of instruction.

Another object of the invention is to provide a word association game on which a time limit is set for the individual player, in which to form a word.

Still another object of the invention is to provide a word association game in which the players may play as individuals, in partnerships or in sets, that is, any number of players against a like number of players.

A further object of the invention is to provide a game which will enlarge the vocabulary of the participants.

Still a further object of the invention is to provide a game which is easy to play, instructive, and stimulating intellectually.

With these objects in mind and others which will become manifest as the description proceeds, reference is to be had to the accompanying drawings, in which like reference characters designate like parts in the several views thereof, in which:

FIG. 1 is a top plan view of an indicator board having a rotatable spinner or pointer mounted thereon;

FIG. 2 is a side elevational view of the indicator board with the pointer being shown as pivotally mounted thereon;

FIG. 3 shows a supply of separate letter or playing pieces, each showing a letter of the alphabet thereon;

FIG. 4 is an enlarged perspective view, showing opposite sides of one of the letter or playing pieces;

FIG. 5 shows a typical word association lay-out, built up from individual letter pieces, showing the relationship of the two joined words formed in accordance with the rules of the game;

FIG. 6 is a view similar to FIG. 5, but showing a different word association lay-out;

FIG. 7 is a word association lay-out similar to the showing of FIG. 6, but showing another possible lay-out word association based on the same primary word; and FIG. 8 is a side elevational view of a glass and sand timer, wherewith to limit the time a player is allotted in which to complete a word.

With more detailed reference to the drawing, the numeral 1 designates generally an indicator board, which has a letter and number lay-out 2 imprinted thereon in a circular form around an axle 4 on which axle 4 a pointer 6 is rotatably mounted. The pointer 6 is so journaled as to rotate freely, when spun by a player. The pointer 6 will stop within an area 14 or 16, as defined by radiating lines 8. Adjacent radiating lines 8 define the area 16 in which letters 10 and numerals 12 are located, with one letter and one numeral in each area, the purpose of which arrangement will become evident hereinafter.

One or more radial areas or spaces 14 are provided in side by side relation with the spaces 16, and which spaces or areas 14, are indicated as "free." In the present instance, two such spaces or areas are shown, however, these may be increased or deccreased to give different odds to the players, as desired.

Individually lettered playing pieces or thin blocks 18 are provided, which playing pieces are preferably rectangular plinths, each preferably bearing a different letter on each side, as for instance, one playing piece may have the letter A on one side thereof and the letter Z on the opposite side, with a small indicia letter on the same side with the prominent letter or dominant letter, to indicate the dominant letter that appears on the opposite side of the piece, thereby providing an increased number of letters from which to form words, without increasing the number of playing pieces.

In order to prevent a player from prolonging the play unduly, a timer, designated at 19, is provided to time a given number of minutes in which the play may be completed or the player loses his turn. The timer may be mechanical or it may be a simple "hour-glass" type, such as two glass bulbs 20 interconnected with a reduced portion 22, and partially filled with a granular material 24, which timer is so constructed as to run the granular from one bulb to the other in a given time, for instance three minutes. A plurality of timers may be provided, so if a player completes a play in less than the given time, another timer may be employed for the next player, without having to wait for the first timer to complete the timed sequence.

The game comprises a minimum of elements, that is, the indicator board 1, the playing pieces or rectangular plinths 18 and the timer 19.

To play the game the players may play as individuals, play as partners or in sets and the score may be kept in any conventional manner, as with a pad and pencil (not shown) or such other arrangement as to record the score of the individual, the partners or the set of players.

OPERATION

The lettered playing pieces 18 are placed on a suitable surface, such as a table, for easy selection by the players. A plurality of timers 19 are put in an accessible location for use by the players.

The indicator board 1, which has a rotatable pointer 6 mounted thereon, is passed from player to player, clockwise, for each player to spin the pointer and the player spinning the pointer 6 and receiving the highest number or the lowest number, whichever arrangement has been preselected, will begin the play, which play will rotate in a clockwise direction from the initial player. Any number, such as indicated at 12, which the starting player receives, will be the number of letters in the word of the starting player, as for instance the number is 5, the player will then spin the pointer again to arrive at the alphabet letter with which the word must start, as for example the letter P in FIG. 5. In the present instance there are two areas or spaces 14 which are indicated "free." If the pointer 6 stops on a "free" space, the player may choose a word with any number of letters or with any starting letter he wishes. Upon a second player spinning the pointer 6, if the pointer should stop within a "free" space 14, the second player may choose a number, if the number is higher, then the second player has the right to play first.

Upon a player selecting a starting letter, for example P and the number of letters in a word, such as five, see FIG. 5, the timer 19 is started and the player is given a fixed time, such as three minutes to select and start the word. If the word, such as "phone" is started within the predetermined time limit, the first player is given a score of one point for each letter of the completed, accepted word. If the word is not started within the time limit, the next player in turn will spin the pointer once for a number and again for a letter with which to begin a word. Whereupon, a timer is started and a like amount of time given the player to start the word.

Upon completion of a word by laying the lettered playing pieces in abutting relation to form the word, the word being verified as an acceptable word by the majority of the players and/or with the help of a dictionary, the player is given a score of one point for each letter in the word. The next player in clockwise relation will then play.

The player will determine the number of letters of the word which he will make, which word will use the last letter of the word just formed as the initial letter of the new word to be formed, for example, the player may add an A and an R thereto, FIG. 5, at right angles to the word "PHONE" to form an associated word "EAR." Upon completion of a true association word, which word is acceptable to the majority of the players, or is defined by the dictionary as being an acceptable word, the letters of the preceding word, except the last letter, are removed from the playing surface to leave the new word from which to start a third word at right angles to the last letter of the second word in the manner as hereinbefore set out. The player is given a point for each letter of the completed word. The word must have an association with the previous word, that is, it must bear a tangible relationship with the preceding word, for instance a synonym, a thought suggestion, an element of a word that can be correlated with the base word.

To continue the game, after a word is completed the next player in clockwise relation, plays. When the third or successive words are started by succeeding players, either horizontally or vertically, the first letter of the word being determined by the last of the preceding word, the word must be started within the predetermined time indicated by the timer, to be correlated with the word to which it is joined. If the player does not start such word within the predetermined time, and the completed word is not verified as being a suitable association with the word to which it is joined, or the dictionary does not give a definition which would associate the word with the word to which it is joined, the word would be declared void, the letters removed, and one point for each letter of the word deducted from the score of the player, and the next successive player in the manner hereinbefore described.

When a word is completed, which is a true association word and was started within the prescribed time, and the word is verified by a majority of the players and/or with the help of a dictionary, the player completing the word is given a point for each letter of the word formed depending from the last letter of the preceding word. If the word formed onto the preceding word is ruled not to have a true association with the prior word, a point is deducted for each letter of the word formed thereonto.

Upon the second word being completed and the word having been ruled as being an acceptable association word, the same procedure of selecting and forming the third word and subsequent words by successive players, is followed. With each starting the new word with the last letter of the previous word and placing the lettered playing pieces at a right angle to the previous word.

If a word has been built on the playing surface which has more than one meaning but is spelled the same, the next player may use any meaning for choosing the association word, for example, if the initial word is "SLIP" the player might choose an associated word such as "PLUNGE," FIG. 6, or "PETTICOAT," FIG. 7, either of which would be acceptable. Upon completion of an associated word, all but the last letter of the preceding word is removed and one point for each letter of the new word is added to the players score.

After the player has announced a word and has placed one or more letters onto the playing surface and the time runs out, the player is allowed to complete the word and have credit therefor, if it is a valid association word. If the word is misspelled, a point for each letter of the word is deducted from the score of the player. If none of the players can produce a valid association word to build onto the preceding word, after all have had a turn at trying to form an associated word, and no new word is formed thereonto, when the turn comes to the player who put the word on the playing surface, the word is removed, with the player being awarded a double number of points for each letter of the word.

A game can be considered any predetermined number of points, as for instance 100 points, and the player who reaches this number of points first is declared the winner. While the above description is with respect to indvidual players receiving score, the players may play partners, with the score of each player being added to the partnership score, or if the players play in groups, other than partners, the score of the individual player of the group is added to the group score.

In event a player cannot contribute a word by adding playing pieces on the board, either for the first or subsequent words, he will forfeit one point and lose his turn. If he has no points from which to subtract, the player will "go in the hole" by having a negative score. If an unacceptable word is formed, a point for each letter of the unacceptable word will be deducted from the score, and if the player does not have sufficient score, he will "go in the hole" that number of points and the player will have to overcome the minus points before he can start a positive score. Any number of "free" spaces may be provided on the indicator board.

While the letters are arranged sequentially from A to Z on the indicator board 1, it is to be understood that these letters may be arranged at random and the letters may either be arranged in sequential order or arranged at random. The numbers may be arranged at random as shown on the indicator board.

While the game has been shown and described in one embodiment thereto, it is to be understood that changes may be made in the minor details of construction and variations made in the manner of playing to adapt it to different conditions, without departing from the spirit of the invention or the scope of the appended claim.

Having thus clearly shown and described the invention, what is claimed as new and desired to be secured by Letters Patent is:

1. A game apparatus comprising:
    (a) a playing surface,
    (b) a board having a letter and numeral layout thereon, which letters and numerals are arranged circumferentially about an axis,
    (c) a pointer mounted on said board for rotation about said axis,
        (1) said pointer adapted to be spun about said axis to determine the number of letters in the word to be built,
        (2) said pointer adapted to be spun about said axis a second time, to determine the intial letter of a word,
    (d) playing pieces, each having a letter on each of two opposed faces thereof, and
        (1) each said playing piece having a smaller index letter on each of said two opposed faces thereof to indicate the letter on the opposite face thereof, the index letter differing only in size from the letter on the opposite face.

References Cited

UNITED STATES PATENTS

| | | | |
|---|---|---|---|
| 1,459,996 | 6/1923 | Schwarz | 35—35(F)X |
| 1,650,840 | 11/1927 | Katz | 35—34(H)X |
| 2,380,106 | 7/1945 | Hilton | 273—135(D) |
| 3,396,972 | 8/1968 | Smith | 273—135(D) |

OTHER REFERENCES

Playthings, January 1956, p. 4.

RICHARD C. PINKHAM, Primary Examiner

P. E. SHAPIRO, Assistant Examiner

U.S. Cl. X.R.

35—35J, 71; 273—137C